Jan. 10, 1967 S. L. THYLANDER 3,297,952

CIRCUIT ARRANGEMENT FOR PRODUCING A PULSE TRAIN IN WHICH THE EDGES OF THE PULSES HAVE AN EXACTLY DEFINED TIME POSITION

Filed May 28, 1965

INVENTOR.

STIG LENNART THYLANDER

BY

Hane and Nydick

ATTORNEYS

United States Patent Office 3,297,952
Patented Jan. 10, 1967

3,297,952

CIRCUIT ARRANGEMENT FOR PRODUCING A PULSE TRAIN IN WHICH THE EDGES OF THE PULSES HAVE AN EXACTLY DEFINED TIME POSITION

Stig Lennart Thylander, Molndal, Sweden, assignor to Telefonaktiebolaget L M Ericsson, Stockholm, Sweden, a corporation of Sweden Filed May 28, 1965, Ser. No. 459,831
Claims priority, application Sweden, June 12, 1964, 7,168/64
2 Claims. (Cl. 328—61)

The present invention relates to a circuit arrangement for producing by means of an oscillator having an exactly defined frequency a pulse train in which the leading edge and the trailing edge of the pulses have an exactly defined time position.

In, for example, pulse-Doppler equipments, it is of importance that both the leading edge and the trailing edge of the pulses be well defined. If, for frequency division, a binary chain is used, the uncertainty in time in the binary stages will cause an uncertainty in the time position of the outgoing pulses.

The basic idea of the invention resides in the fact that the edges of the generated pulses are made independent of the binary chain and that these edges are defined only by an oscillator having an exactly defined frequency, for example, a quartz oscillator.

The circuit arrangement according to the invention comprises: a trigger circuit which is driven by an oscillator and which has two alternating outputs; an $n$-stage counting chain serving as frequency divider which is stepped forward by the changes of condition of the trigger circuit and which, by means of its $n$-stages, produces a frequency division of $2^n$; and two AND-circuits. One of the AND-circuits is adapted to start, by its active condition, a signal in a pulse-generating circuit, and the second of the AND-circuits is adapted to end, but its active condition, said signal. The length of the signal corresponds to a desired number of oscillator periods. More particularly, the outputs of the stages of the frequency divider which are activated during a trigger generator period selected for the starting and the ending, respectively, of said signal are connected to the respective AND-circuit together with an output of the trigger circuit which is 180° out of phase with the output of the trigger circuit which steps forward the frequency divider so that the activation moment of the AND-circuits is determined by the well-defined activation moment of the outputs of the trigger circuit.

Figure 1:
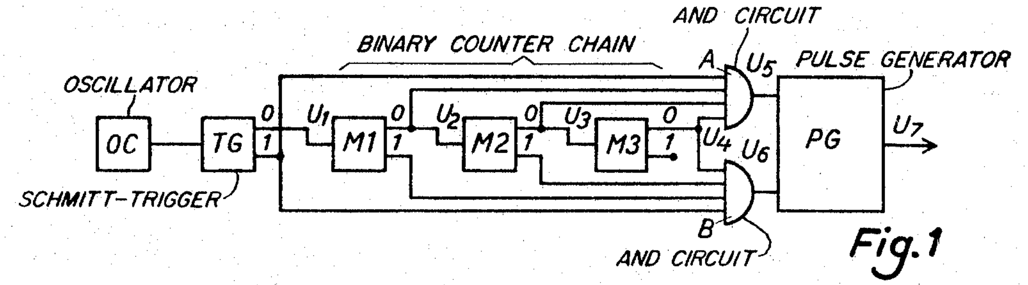

The invention will be explained hereinafter in connection with an embodiment with reference to the accompanying drawing, in which FIG. 1 shows a block diagram of an arrangement according to the invention, and FIGS. 2*a* to 2*g* show the time process of the pulses in different circuits of FIG. 1.

In FIG. 1 a quartz oscillator OC drives a rapid trigger circuit TG, for example, a direct current Schmitt trigger. Circuit TG has an 0-output and a 1-output, each of which generates a voltage which changes in step with the frequency of the quartz oscillator between two values, for example, 0-voltage (0-condition) and a determined signal voltage (1-condition). The 0-output is assumed at the starting moment to be in 1-condition. The circuit arrangement according to FIG. 1 further comprises a binary counting chain which consists of bistable circuits M1, M2, M3 and which can carry out frequency division by 8, and furthermore, the two AND-circuits A and B. The 0-output of the trigger circuit TG is connected to the input of the first stage M1, and the 1-output of the trigger circuit is connected both to an input of the AND-circuit A and input of the AND-circuit B. The 0-output of the first binary stage M1 is connected to the input of the second binary stage M2 and to an input of the AND-circuit A, whereas its 1-output is connected to an input of the AND-circuit B. The 0-output of the second binary stage M2 is connected to the input of the third binary stage M3, and to an input of the AND-circuit A, while its 1-output is connected to an input of the AND-circuit B. The 0-output of the third binary stage M3 is finally connected to both an input of the AND-circuit A and to an input of the AND-circuit B. The outputs of the AND-circuit A and of the AND-circuit B are connected to a pulse-generating circuit PG which may be of arbitrary type, such as a bistable trigger, and which when receiving a signal from the output of the AND-circuit A starts a pulse, whereas when receiving a signal from the output of AND-circuit B it terminates this pulse. The arrangement shown refers to the case where the length of the pulse period is eight times the length of the oscillator period and the pulse length is three times the length of the oscillator period. As will be explained hereinafter, it is possible, however, by means of suitable connections between the counting chain and the AND-circuits, to obtain the pulse period $T=2^n \cdot T_{osc}$, where $n$ may be an arbitrary number, and to obtain the pulse length $\tau=m \cdot T_{osc}$, where $m$ is an arbitrary natural number less than $2^n$.

Figures 2A, 2B, 2C, 2D, 2E, 2F, 2G:
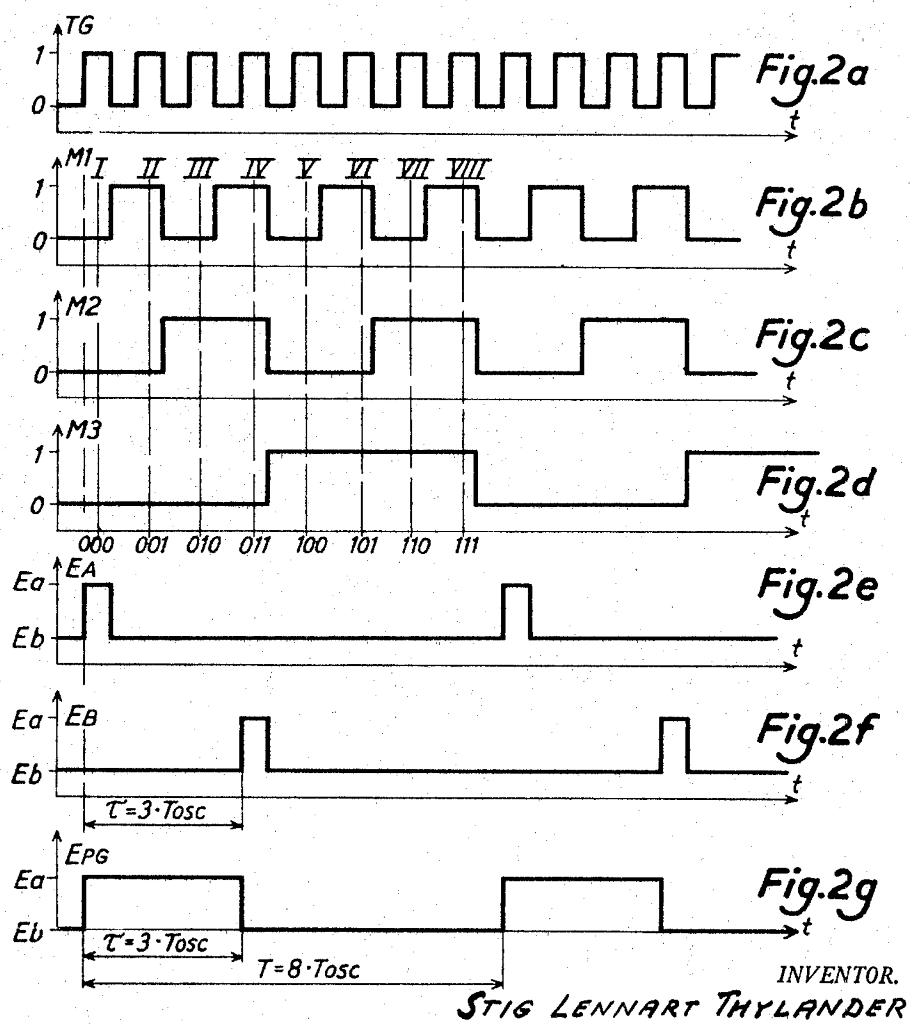

FIG. 2*a* shows the time process of the change between the activated condition of the 0-output and of the 1-output in the trigger circuit TG. More particularly, FIG. 2*a* shows the voltage at the 0-output. The voltage at the 1-output is its inverse value. In the starting moment the 0-output of the trigger circuit has a signal voltage; then the 1-output will be activated, which, however, does not cause any change in the condition of the first binary stage M1. Only when the 0-output of the trigger circuit is activated does a change of condition occur in the binary stage M1, which implies that the activated condition of the 0-output of the stage M1 ceases and the 1-output is activated, as is indicated in FIG. 2*b*, while in the other stages no change will occur. FIG. 2*b*, shows the voltage at the 1-output thereof, while the 0-output will be its inverse. FIGS. 2*c* and 2*d* show in a corresponding manner the variations of condition in the stages M2 and M3 between the activated and non-activated conditions of the two outputs. As is apparent, a stepping forward of the chain occurs only when the 0-output is activated, while upon activation of the 1-output, no stepping forward will occur. FIGS. 2*e* and 2*f* show the pulses obtained on the output of the AND-circuit A and of the AND-circuit B, respectively.

It appears that if the connections between the counting chain and the AND-circuits are selected according to FIG. 1, an output signal will be obtained from the circuit A when the 0-outputs of the stages M1, M2, M3 and the 1-output of the trigger circuit TG are activated as is indicated in FIGS. 2*a*–2*d* by means of the dash-dotted line. In a corresponding manner an output signal from the circuit B is obtained when the 1-outputs of the stages M1, M2 and the 0-output of the stage M3 and the 1-output of the trigger circuit TG are activated as is indicated by the dash-dotted line IV. Obviously it is possible to produce within the pulse period which can be obtained by means of the frequency division an arbitrary pulse-interval relation by a suitable combination of the outputs of the stages. According to the example of the pulse length $\tau=3 \cdot T_{osc}$ is indicated in FIG. 2*g*.

If another pulse length is desirable, for example, $\tau=2 \cdot T_{osc}$, that is, that the pulse from the AND-circuit B should occur two base pulse periods after the pulse from the AND-circuit A, the outputs corresponding to the dash-dotted line III will be connected to the input of the AND-circuit B that is, besides the 1-output of the trigger circuit, also the 0-output of the M1 stage, the 1-output of the M2 stage and the 0-output of the M3 stage.

The simple rule may be established that if the outputs of the binary stages connected to the AND-circuit may be defined by the binary number 000, the outputs of the binary stages connected to the AND-circuit B will be defined by the number $m$ in the relation $\tau = m \cdot T_{osc}$, that is, according to the described embodiment, 011=3. For example $M=5$ the outputs 101 are connected to the AND-circuit B (line VI), etc.

The important feature in the arrangement according to the invention is, as clearly appears from the diagrams 2*a*–2*g*, that the inputs of the AND-circuits A and B, coming from the binary stages, are already activated when the input coming from the trigger circuit TG is activated. In this manner the initial moment of the pulse will be defined only by the rapid and well-defined voltage variations of the trigger circuit, which voltage variations consequently determine the time position of the leading edges of the pulse train coming from the AND-circuits A and B, respectively, and thus the time position of the pulses obtained from the output of the pulse-generating circuit PG.

I claim:

1. A circuit arrangement for producing a train of pulse-shaped signals in which each pulse has a leading edge with an exactly defined time position and a trailing edge with an exactly defined time position, said circuit arrangement comprising: a trigger circuit having an input and two outputs activated alternatively in dependence on the polarity of a signal supplied to said input; an oscillator means for supplying an alternating potential to said input so as to activate said two outputs alternatingly to produce at each output oppositely phased pulses having the frequency of said alternating potential; a binary counting chain comprising a plurality of serially connected bistable stages, each of said stages having a first output activated in one of two possible states, a second output activated in the other of the two states and an input which when receiving a signal switches the stage from one bistable condition to another; means for connecting the input of the first bistable stage to one of the outputs of said trigger circuit and for connecting the input of the other stages to one of the outputs of the preceding stage; a pulse-generating circuit including first and second inputs for starting a pulse-shaped signal when receiving the leading edge of a pulse at said first input and terminating the pulse-shaped signal when receiving the leading edge of another pulse at said second input; a first AND-circuit having an output connected to said first input and a second AND-circuit having an output connected to said second input of said pulse-generating circuit, said first AND-circuit having an input connected to an output of said trigger circuit in order to obtain a pulse for starting said pulse-shaped signal and said second AND-circuit having an input connected to the same output of said trigger circuit for obtaining a pulse for terminating said pulse-shaped signal, said first AND-circuit having further inputs connected to outputs of the bistable stages in said binary counting chain selected so as to gate by their simultaneous activation a pulse from the output of said trigger circuit for starting said pulse-shaped signal and said second AND-circuit having further inputs connected to outputs of the bistable stages in said binary counting chain so as to gate by their simultaneous activation a pulse from said output of said trigger circuit for terminating said pulse-shaped signal, said output on the trigger circuit connected to said inputs of said AND-circuits being different from the output connected to the input of the first bistable stage of said binary counting chain.

2. A circuit arrangement according to claim 1 in which the outputs of the bistable stages of said binary counting chain connected to the first of said AND-circuits and the outputs of said bistable stages connected to the other AND-circuit are selected in a manner such that a binary number represented by the condition of said bistable stages indicates the duration of the generated pulse-shaped signal relative to the period of pulses generated by said trigger circuit.

References Cited by the Examiner

UNITED STATES PATENTS 3,189,832 6/1965 Pugh ............... 328—42

FOREIGN PATENTS 1,137,480 10/1962 Germany.

ARTHUR GAUSS, *Primary Examiner.*

J. ZAZWORSKY, *Assistant Examiner.*